United States Patent [19]

Takahashi et al.

[11] Patent Number: 5,305,115
[45] Date of Patent: Apr. 19, 1994

[54] HIGHLY EFFICIENT PICTURE CODING METHOD WITH MOTION-ADAPTIVE ZONAL SAMPLING ENABLING OPTIMIZED IMAGE SIGNAL COMPRESSION

[75] Inventors: Toshiya Takahashi; Toshihide Akiyama, both of Takatsuki, Japan

[73] Assignee: Matsushita Electric Industrial Co., Ltd., Osaka, Japan

[21] Appl. No.: 987,092

[22] Filed: Dec. 7, 1992

Related U.S. Application Data

[63] Continuation of Ser. No. 564,763, Aug. 3, 1990, abandoned.

[30] Foreign Application Priority Data

Aug. 5, 1989 [JP] Japan ................................. 1-203372
Aug. 18, 1989 [JP] Japan ................................. 1-213381

[51] Int. Cl.$^5$ ............................................. H04N 1/415
[52] U.S. Cl. .................................... 358/432; 348/409; 348/390
[58] Field of Search ............... 358/133, 135, 136, 433, 358/432, 138; 382/56; 364/725; H04N 7/137

[56] References Cited

U.S. PATENT DOCUMENTS 4,821,119  4/1990  Gharavi .................. 358/133
4,982,285  1/1991  Sugiyama .................. 358/135
5,046,071  3/1991  Tanoi .................. 358/135
5,117,287  5/1992  Koike et al. .................. 358/135

OTHER PUBLICATIONS

"Transform Coding of Images" by R. J. Clarke, Academic Press, 1985, pp. 185-193, 234-239, & 561.
"Adaptive Three-Dimensional Transform Coding for Moving Pictures", Akiyama et al., Image Technology Research Laboratory, Osaka, Japan.

*Primary Examiner*—Edward L. Coles, Sr.
*Assistant Examiner*—Kim Yen Vu
*Attorney, Agent, or Firm*—Wenderoth, Lind & Ponack

[57] ABSTRACT

A picture coding method includes the steps of translating the data of an image into 3-dimensional blocks and detecting their movements, in which the transform coefficients of a high degree in the space associated with the 3-dimensional blocks where more movement is involved are removed for reducing spatial resolution while maintaining time resolution and also, the transform coefficients of a high degree in the time associated with the 3-dimensional blocks where less movement is involved are removed for reducing time resolution while maintaining spatial resolution, so that the effective compression of the data can be implemented without a great visual degradation in the picture quality.

22 Claims, 8 Drawing Sheets

HIGHLY EFFICIENT PICTURE CODING METHOD WITH MOTION-ADAPTIVE ZONAL SAMPLING ENABLING OPTIMIZED IMAGE SIGNAL COMPRESSION

This application is a continuation of now abandoned application, Ser. No. 07/564,763, filed on Aug. 3, 1990.

BACKGROUND OF THE INVENTION

1. Field of the Invention

The present invention relates to a method of coding a picture signal with a high efficiency.

2. Description of the Prior Art

It is now known that the digital form of a picture signal can be transmitted at a speed of more than 100 Mbps and can hardly be carried out through existing communication lines in the terms of transmittable amount and cost. Various picture coding methods and their apparatus have been introduced offering the techniques of eliminating the redundancy of picture signals and reducing the speed of signal transmission. One of them is an orthogonal transform coding apparatus which has widely been employed.

A prior art orthogonal transform apparatus will be described referring to the drawings.

It is understood that a natural image in which less movement is involved allows the horizontal and vertical and time base correlation between pixels to be higher and its corresponding transform coefficients are great in energy at the low sequence and small at the high sequence.

FIG. 8 is a block diagram showing a prior art 3-dimension orthogonal transform coding apparatus.

As shown in FIG. 8, there are provided an input buffer 81, an orthogonal transform block 82, a zonal sampling block 83, a 3-dimensional block activity estimation block 84, a 3-dimensional block classification block 85, a transform coefficient energy calculation block 86, a bit allocation calculation block 87, a normalization block 88, a transform coefficient quantization block 89, a multiplexer 810 and an output buffer 811.

An orthogonal transform coding method associated with the prior art orthogonal transform coding apparatus will is described below.

As shown in FIG. 8, the image data of K-frames are fed and stored in the input buffer 81. Then, they are read out in the form of $M \times M \times K$ 3-dimensional blocks and orthogonally transformed by the orthogonal transform block 82. High sequence coefficients of the corresponding transform coefficients delivered from the orthogonal transform block 82 are blocked in three dimensions by the zonal sampling block 83 while the remaining low sequence coefficients are passed through. The transform coefficients passing the zonal sampling block 83 are transferred to the activity estimation block 84 where the activity in the image of the 3-dimensional block is calculated from:

$$E = \sum_{u=0}^{M-1} \sum_{v=0}^{N-1} \sum_{w=0}^{W-1} [F(u,v,w) \times F(u,v,w)] - F(0,0,0)^2$$

where $F(u, v, w)$ is a transform coefficient of the 3-dimensional block. The resultant activity values are then fed to the classification block 85 and separated into k-number of classes by the amount of energy of each 3-dimensional block. In each class of the 3-dimension blocks, the variance of the transform coefficient is calculated by the energy calculation block 86. From the resultant variance, the bit allocation in each class is then calculated by the bit allocation calculation block 87 for providing a bit map, using an equation expressed by:

$$N_k(u,v,w) = \tfrac{1}{2}\log_2[\sigma_k^2(u,v,w)] - \log_2[D]$$
$$(u,v,w) \neq (0,0,0)$$

where $\sigma_k^2(u, v, w)$ is a variance of the transform coefficient assigned to a k class and D is a parameter. $N_k(u, v, w)$ can be determined for a desired speed of transmission by controlling the value of D. The bit allocation calculation block 87 delivers a coefficient for normalization in each class. The normalization coefficient may be a variance or the maximum value of a transform coefficient contained in the class. The transform coefficients from the orthogonal transform block 83 are also transferred to the normalization block 88 for normalization with the normalization coefficient and then, quantized by the quantizer 89 according to the bit allocation computed. The quantized output, the bit allocation map, and the class identifier are fed to the multiplexer 810 for coding and controlled in the transmission velocity by the output buffer 811 prior to delivery to the transmission line.

As described above, the high sequence coefficients associated with small energy and low visibility are removed by zonal sampling of the transform coefficients so that a signal compression with a reduced degradation of picture quality can be ensured. Also, the bit allocation corresponding to the energy of each block is made and thus, the compression will be possible considering the local properties of an image (for example, as disclosed in "Transform Coding of Images" by R. J. Clarke, issued by Academic Press in 1985).

However, according to the aforementioned arrangement, the high sequence coefficients are removed systematically and the picture quality of a particular image, e.g. a miniature image, which contains a large number of high sequence components will be reduced to a considerable degree. Also, the moving region of the image contains more time-base high sequence components of the 3-dimension orthogonal transform coefficients and less spatial high sequence components while the still image region contains less the former and more the latter. Accordingly, when the time-base high sequence components are removed, the active image will appear discontinuous in motion.

The bit allocation is determined by measuring the amount of energy not distinguishing between the moving and unmoving regions of the image and the bit allocation map will be established regardless of the distinct movements. As the result, the drawback is that the bit allocation is provided restricting the movement in the moving region and decreasing the resolution in the still region.

SUMMARY OF THE INVENTION

It is an object of the present invention to provide a picture coding method for compressing the data of a picture signal with no substantial visual deterioration regardless of the elaborate pattern or active movement of an image.

For accomplishment of the foregoing object, the method according to the present invention comprises the steps of: translating a sample point in an image signal from each of at least K-frames into a 3-dimensional block in the form of an $M \times N \times K$ sample point containing horizontal and vertical and time-base components, in which the sample point which is a 3-dimension block and represented by $$f(x, y, t) \ (x=0 \text{ to } M-1, y=0 \text{ to } N-1, t=0 \text{ to } K-1);$$

is orthogonally transformed to a transform coefficient of 3-dimension expressed as $$F(u, v, w) \ (u=0 \text{ to } M-1, v=0 \text{ to } N-1, w=0 \text{ to } K-1);$$

calculating the movement of a 2-dimensional block which is a part of the 3-dimensional block during a period of time between t=0 and t=K−1; selecting the transform coefficient to be coded by examining the movement, identifying whether the 3-dimension transform coefficient F (u, v, w) belongs to the motion or still block according to the result of motion detection; after separation into the motion and still block groups, dividing the blocks into k1 and k2 classes by the amount of energy of each 3-dimensional block expressed as $$E = \sum_{u=0}^{M-1} \sum_{v=0}^{N-1} \sum_{w=0}^{W-1} [F(u,v,w) \times F(u,v,w)] - F(0,0,0)^2;$$

and determining the allocation of bits of each class in proportion to a variance of the transform coefficient of the 3-dimensional block of the class, which is expressed by $$\sigma_k^2(u, v, w).$$

Accordingly, the spatial resolution can be reduced at the region where more movement is involved while the time resolution is increased. Simultaneously, at the region where less movement is involved, the spatial resolution is increased and the time resolution is reduced. Hence, the visual deterioration in an image which is elaborate and exhibits radical movements will be minimized and also, the compression of image data will be enhanced in the picture coding procedure.

After separation into the motion and still blocks, the 3-dimensional blocks are classified for bit allocation by the amount of energy thereof in each group, whereby the coding will be carried out so that the local properties in the image are exactly appreciated.

BRIEF DESCRIPTION OF THE DRAWINGS

FIGS. 7(a)-7(b) are an explanatory views showing the sequential transmission of the transform coefficients of 3-dimensional blocks in a transform space according to the picture coding method of the present invention.

DESCRIPTION OF THE PREFERRED EMBODIMENTS

Preferred embodiments of the present invention will then be described in the form of a picture signal coding method, referring to the accompanying drawings.

Figure 1A:
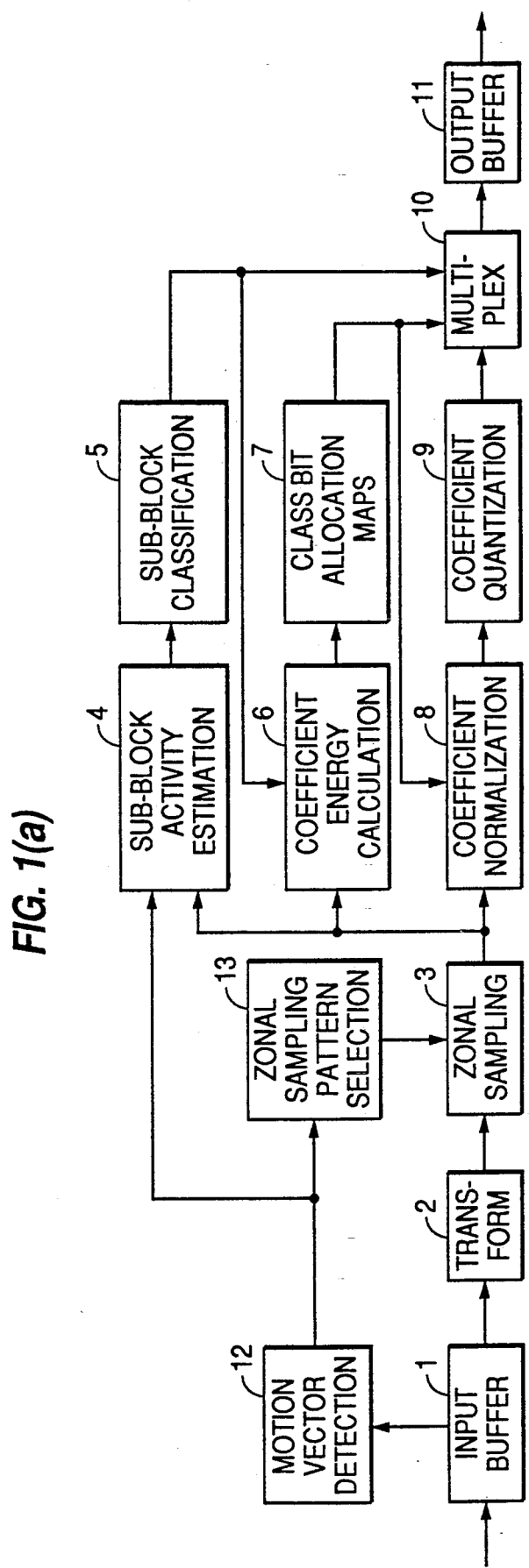
FIG. 1(a) is a block diagram of a picture coding method showing a first embodiment of the present invention.
Figure 2:
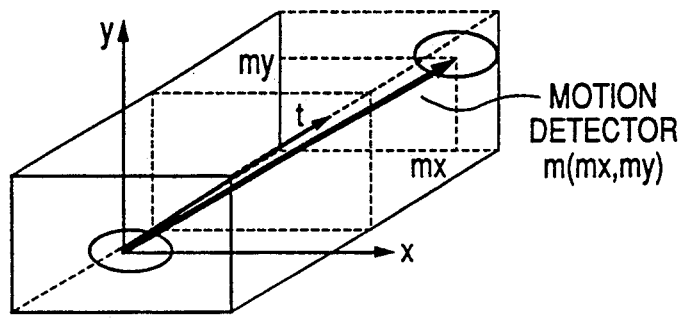
FIG. 2 is an explanatory view showing a motion vector.
Figure 3A:
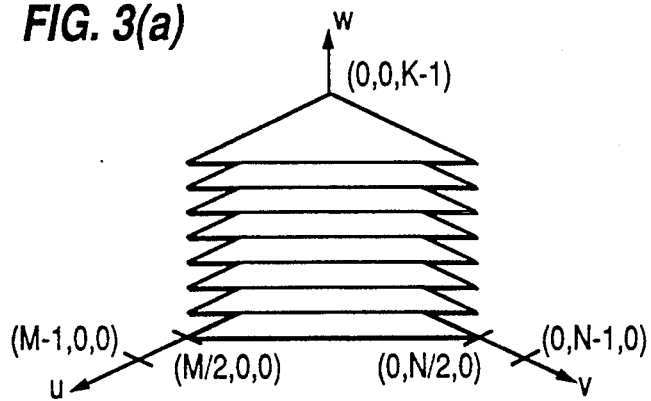
FIGS. 3(a)-3(b) are explanatory views showing zonal sampling patterns.
Figure 3B:
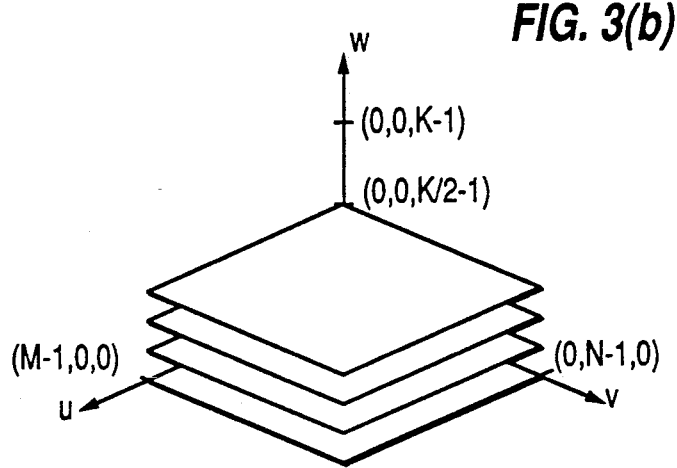

FIG. 1(a) is a block diagram of a picture coding method showing a first embodiment of the present invention. FIG. 2 is an explanatory view showing the detection of a motion vector. FIGS. 3(a)-3(b) are explanatory views showing zonal sampling patterns.

As shown in FIG. 1(a), an input buffer 1, an orthogonal transform block 2, a zonal sampling block 3, a 3-dimensional block activity estimation block 4, a 3-dimensional block classification block 5, a transform coefficient energy calculation block 6, a bit allocation calculation block 7, a transform coefficient normalization block 8, a transform coefficient quantizer 9, a multiplexer 10, an output buffer 11, a motion vector detection block 12, and a zonal sampling pattern selection block 13 are provided. The arrangement is similar to that of the prior art, except for the zonal sampling block 3, the activity estimation block 4, the motion vector detection block 12 and the zonal sampling pattern selection block 13.

The image data of K-frames supplied are stored in the input buffer 1. The image data is expressed in the form of a 3-dimensional block designated by:

$$f(x, y, t) \ (x=0 \text{ to } M-1, y=0 \text{ to } N-1, t=0 \text{ to } K-1).$$

The 3-dimensional block is orthogonally transformed by the orthogonal transform block 2 which in turn delivers an output of transform coefficients representing a 3-dimensional block in a transform domain. The 3-dimensional block of the transform coefficients in the transform space is expressed as:

$$F(u, v, w) \ (u=0 \text{ to } M-1, v=0 \text{ to } N-1, w=0 \text{ to } K-1).$$

Simultaneously, the image data of K-frames stored in the input buffer is transferred to the motion vector detection block 12 determining a motion vector m (mx, my) (where mx is a horizontal movement and my is a vertical movement).

The motion vector is computed by the following procedures. First, a t=0 frame of the image data supplied is divided into M×N 2-dimensional blocks. Using appropriate image processing means such as block matching, M×N 2-dimensional blocks on a t=1 frame which correspond to the 2-dimensional blocks of the t=0 frame are calculated. The corresponding horizontal and vertical movements are then determined as a motion vector of the t=0 frame. Then, a t=1 frame motion vector is calculated by finding the blocks on a t=2 frame from the M×N 2-dimensional blocks of the t=1 frame. Similarly, subsequent motion vectors are calculated up to a t=K frame and summed to a t=0 to K=1 motion vector.

FIG. 2 illustrates a motion vector m (mx, my) in which the x-axis represents a horizontal direction, the y-axis a vertical direction, and the t-axis a time direction. As shown, the rectangular parallelopiped which is defined by the dotted lines and extends through the t=0 to 2 frames containing M×N×3 pixels, represents a 3-dimensional block which is to be orthogonal transformed. The motion vector m (mx, my) in FIG. 2 indicates that an object in the t=0 2-dimensional block is displaced mx pixels in the horizontal direction and my pixels in the vertical direction between the 0 and 2 frames.

A motion vector can be calculated on the basis of a 3-dimensional block in the following manner. Assuming that a center coordinate point on the 2-dimensional block of
t=0 is (cx, cy) and that of t=K−1 is (cx', cy'), the horizontal movement is expressed as mx'=mx−(cx'−cx) and the vertical movement is expressed as my'=my−(cy'−cy). Then, the detected motion vector m (mx, my) is converted to m' (mx', my').

The 3-dimensional block in the transform domain is then transferred to the zonal sampling block 3 where the transform coefficients are sampled while transform coefficients of higher order are removed adaptionally.

It is known that the visual property of human being is decreased in spatial resolution when viewing a moving object but is capable of maintaining a degree of spatial resolution when viewing a stationary, not moving object. By using the advantage of this property, the orthogonal transform domain can effectively be compressed because of its approximate coincidence with a frequency space. FIGS. 3(a)–3(b) show the sampling of transform coefficients in the transform domain in which the u-axis represents a horizontal direction, the v-axis a vertical direction, and the t-axis a time direction FIG. 3(a) illustrates that time base transform coefficients remain while spatial transform coefficients are removed. As the result, the resolution in the time base is maintained and the resolution in the spatial directions decreases, which will be advantageous in the block movement to great extent. FIG. 3(b) shows the spatial resolution is maintained while the time-base resolution is omitted, which can be appropriate to an almost unmoving object.

Each transform coefficient F (u, v, w) to be sampled is determined by the zonal sampling pattern selection block 13 from the horizontal movement mx, vertical movement my and motion vector $mz=mx^2+my^2$.

The thresholds mxh, myh and mzh of the movements and the thresholds u1, v1 and w1 of the transform coefficients should be prepared beforehand along with the relationship with image quality by carrying out experiments. If $|mx|>mxh$, F (u, v, w) satisfying $u<u1$ is sampled. If $|my|>myh$, F (u, v, w) satisfying $v<v1$ is sampled and if $|mz|<mzh$, F (u, v, w) satisfying $w<w1$.

When more precise control is needed, the thresholds of the transform coefficients u1, v1, w1, u2, v2 and w2 are also provided in addition to mxh, myh and mzh. Hence, the thresholds up, vp and wp are expressed as up=u1 if $|mx|>mxh$ or up=u2 where $u1<u2$ if $|mx|\leq mxh$, vp=v1 if $|my|>myh$ or vp=v2 where $v1<v2$ if $|my|\leq myh$, and wp=w1 if mz<mzh or wp=w2 where $w1<w2$ if $mz\leq mzh$.

Thus, F (u, v, w) which satisfies p (u, v, w)<c where p (u, v, w) is an equation representing a plane or curved surface across the points (up, 0, 0), (0, vp, 0) and (0, 0, wp) and c is a constant, will be sampled.

The determination of the sampling patterns shown in FIGS. 3(a) and 3(b) when the motion vector m (mx, my) of FIG. 2 is detected is described below.

Assuming that the thresholds of the movements are mxh, myh and mzh and the thresholds of the transform coefficients are u1=M/2, u2=∞, v1=N/2, v2=∞, w1=K/2, and w2=∞ so that degradation in the picture quality is minimized, up, vp and wp expressed up=M/2 if $|mx|>mxh$, vp=N/2 if $|my|>myh$, and wp=∞ if mz>mzh. Hence, the transform coefficients which satisfy the notation p (u, v, w) (=u+v)<(M/2+N/2) representing a plane across the points (M/2, 0, 0), (0, N/2, 0) and (0, 0, ∞) shown in FIG. 3(a) are sampled.

When the motion vector is not more than the threshold because the image is almost motionless, the results are up=∞, vp=∞ and wp=K/2. Then, the transform coefficients which satisfy the notation p (u, v, w) (=w)<K/2 representing a plane across the points (∞, 0, 0), (0, ∞, 0) and (0, 0, K/2) shown in FIG. 3(b) are sampled.

Figure 1B:
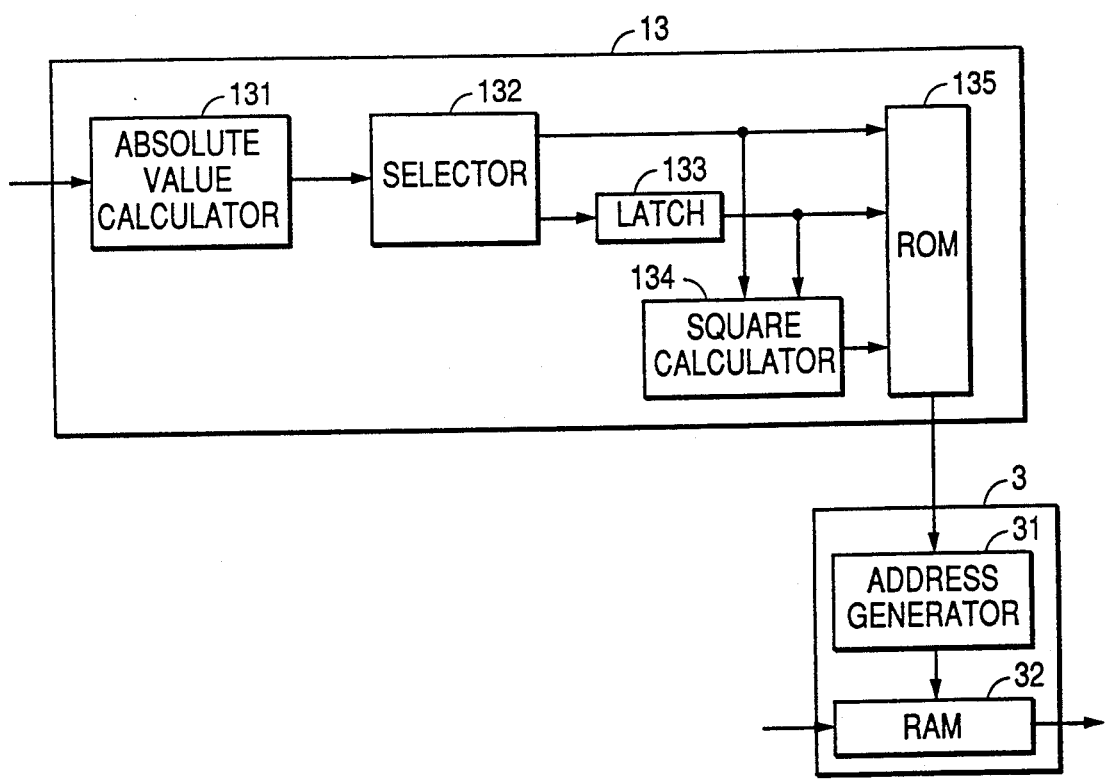
FIG. 1(b) is a block diagram of the zonal sampling pattern detector 13 of FIG. 1(a)

The selection of a zonal sampling pattern and the operation of a zonal sampling block can thus be executed using the apparatus shown in FIG. 1(b).

As shown in FIG. 1(b), the zonal sampling pattern selection unit 13 comprises an absolute value calculator circuit 131, a selector 132, a latch 133, a square calculator circuit 134 and a ROM 135. Also, the zonal sampling unit 3 comprises an address control circuit 31 and a RAM 32.

The motion vector is fed to the absolute value calculator circuit 131 which computes its horizontal and vertical absolute components $|mx|$ and $|my|$ which are in turn separated by the selector 132. The absolute value $|mx|$ which enters earlier than $|my|$ is held by the latch 133 and then, transferred to the ROM 135 together with $mz=mx+my^2$ calculated by the square calculator circuit 134. The ROM 135 in turn generates a predetermined sampling pattern corresponding to the input. Meanwhile, the transform coefficients are held by the RAM 32 in the zonal sampling block 3. The address control circuit 31 delivers an address signal for reading out from the RAM 32 the transform coefficients which correspond to the pattern generated by the ROM 135. At the end of the above procedures, the zonal sampling based on the motion detection is completed.

The zonal sampled transform coefficients are substantially sorted for separation into motion and still picture blocks. Then, each corresponding output is classified, processed for bit allocation, normalized and quantized prior to further transmission along a transfer line. The separation into the motion and still blocks is carried out by computing the detected motion vector m (mx, my) from $mx^2+my^2$ with the activity estimation block 4.

According to the first embodiment, the removal of unwanted transform coefficients is executed corresponding to the movement of an object so that visually indefinite portions of an image can be thinned out. Also, the bit allocation is determined on discriminating between the moving and unmoving portions, allowing the image data to be coded in response to local aspects and compressed with less degradation of image quality. In practice, it was found that about 15% of the data can be removed with no degradation in the image quality using a procedure of computer simulation.

Although the zonal sampling block 3 is provided ahead of the quantization block 9 according to the embodiment, if may be placed after the quantization block 9 with equal success.

Figure 4:
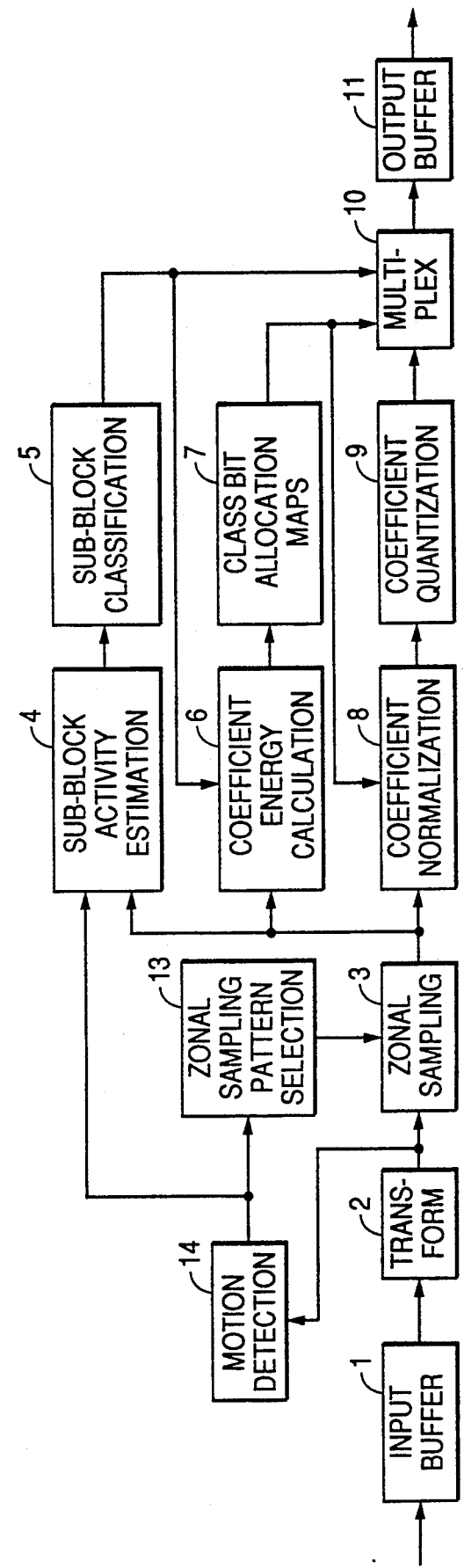
FIG. 4 is a block diagram of a picture coding method showing a second embodiment of the present invention.

FIG. 4 is a block diagram of a picture coding method showing a second embodiment of the present invention, in which a procedure of motion detection is different from the first embodiment. More particularly, as compared with the first embodiment in which the movement is detected by calculating a motion vector, the second embodiment provides a motion detection block 14 for motion detection with using the energy distribution in the orthogonal transform space.

The transform coefficients from the orthogonal transform block 2 are fed to the motion detection block 14 where E0 and E1 are calculated from:

$$E0 = \sum_{u=0}^{M-1}\sum_{v=0}^{N-1} [F(u,v,0) \times F(u,v,0)] - F(0,0,0)^2,$$

$$E1 = \sum_{u=0}^{M-1}\sum_{v=0}^{N-1}\sum_{w=1}^{W-1} [F(u,v,w) \times F(u,v,w)];$$

where F (u, v, w) is a transform coefficient of the 3-dimensional block in a transform domain, E0 is an AC component (complexity in still image) representing the static image activity of a transform coefficient F(u, v, 0) associated with w=0 in the transform domain, and E1 is an AC component (complexity and radical movement in motion image) representing the movement on the time base of a transform coefficient F (u, v, w) associated with w≠0 in the transform space. The comparison between E0 and E1 determines whether the image is active or motionless. From the result of simulation, it was found out that if the ratio Ec=E0/E1 of energy is over 4 to 5, the movements which are sensed by human eyes can equally be identified. In the second embodiment, all the 3-dimensional blocks contained in K-frames are separated into the motion and still block groups by means of the energy ratio Ec=E0/E1.

It would be understood that the threshold for use in the separation is not limited to 4 to 5 according to the embodiment and can be altered depending on the type of an input image.

The second embodiment permits the energy ratio Ec to be used for selection of a zonal sampling pattern. The determination of a zonal sampling pattern can be carried out in the same manner as in the first embodiment when the horizontal and vertical movements are expressed by mx=Ec and my=a×Ec (where a is a multiplier for experimental purposes; more simply, a=1).

In this embodiment, the horizontal and vertical movements are, however, not detected and no more precision control is executed as compared with the first embodiment. Nevertheless, the advantage is that the detection with square calculation allows a hardware of the activity estimation block 4 to be commonly utilized.

Figure 5:
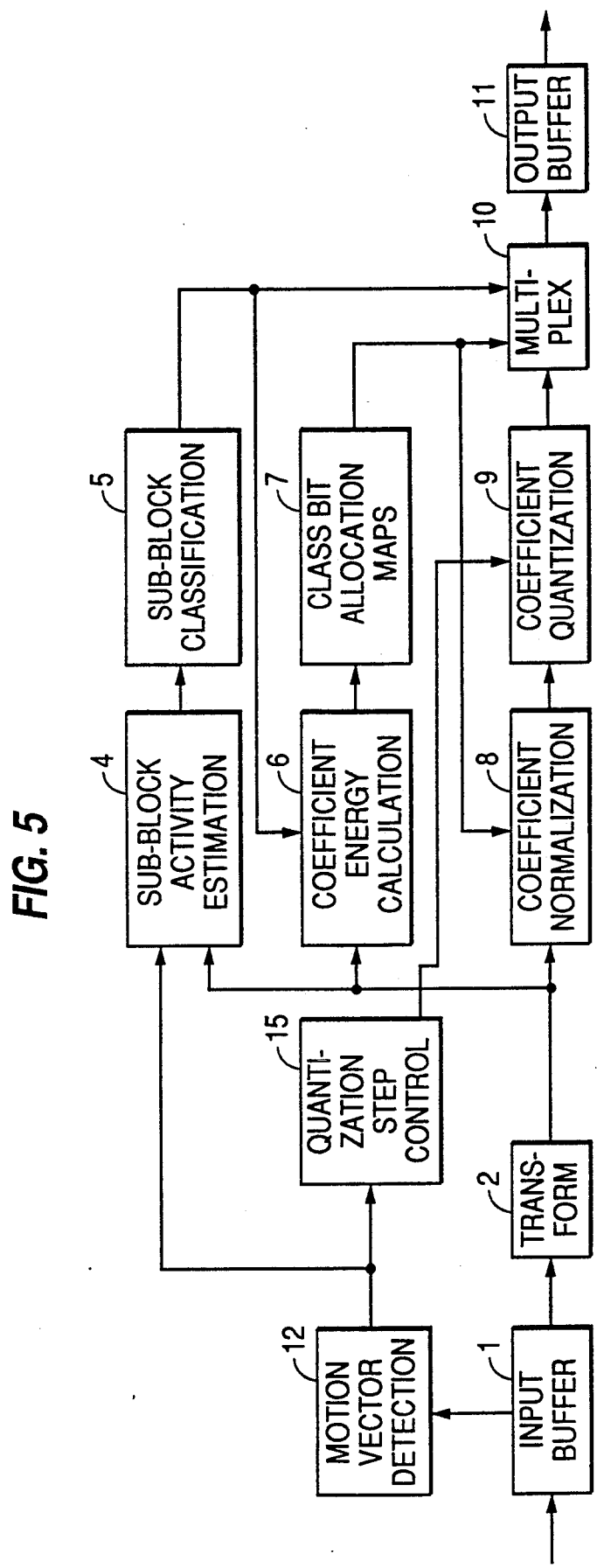
FIG. 5 is a block diagram of a picture coding method showing a third embodiment of the present invention.

FIG. 5 is a block diagram of a picture coding method showing a third embodiment of the present invention, which is different from the first embodiment in that the transform coefficients to be omitted from coding are quantized at greater steps than those to be coded, instead of the selection of transform coefficients, to be coded, by the zonal sampling.

As shown in FIG. 5, the detected motion vector is fed to a quantization step control block 15 which in turn selects the transform coefficients to be coded in the same manner as the zonal sampling pattern selection block 13. The transform coefficients to be coded are quantized at the same steps in a known manner while the transform coefficients to be omitted from coding are quantized at greater steps, e.g. 10 times the conventional quantization step. As a result, each transform coefficient to be omitted from coding is quantized substantially equal to 0, permitting the same operation as that of the first embodiment. According to the embodiment, the quantization step is increased but not limited to 10 times the size.

The operation of the quantization step control block 15 can be implemented by the same arrangement as the zonal sampling pattern selection block 13. While the zonal sampling pattern selection block 13 delivers a sampling pattern from its ROM, the quantization step control block 15 is arranged to deliver a of quantization step signal.

Figure 6:
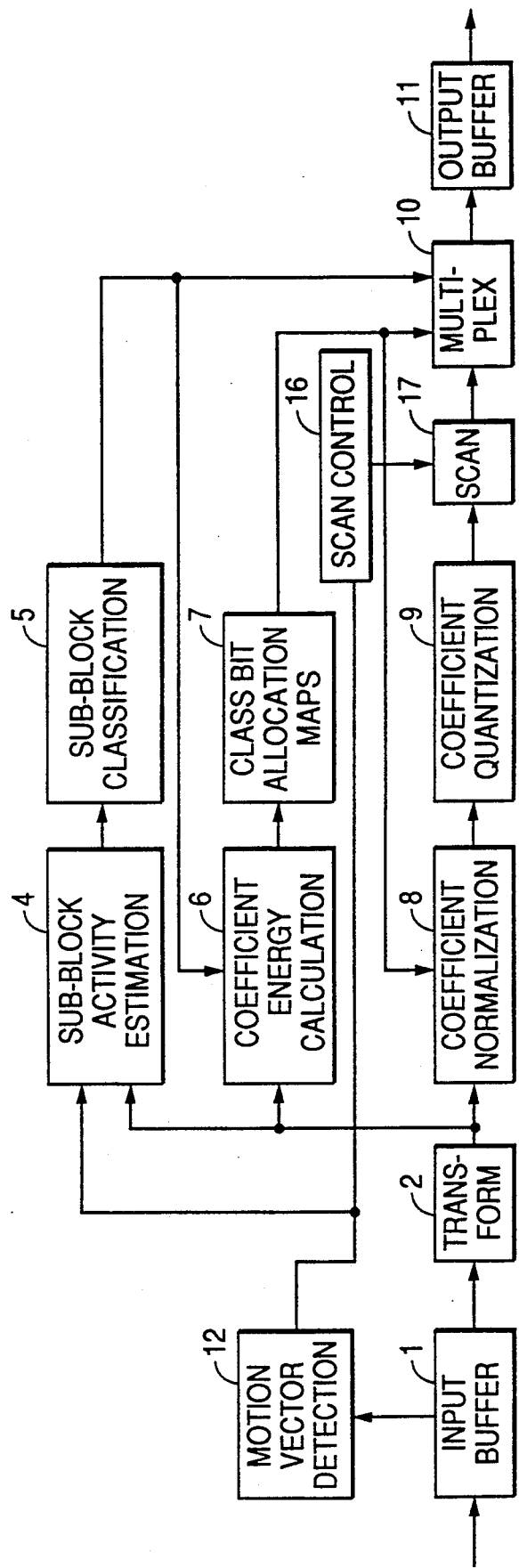
FIG. 6 is a block diagram of a picture coding method showing a fourth embodiment of the present invention.
Figure 8:
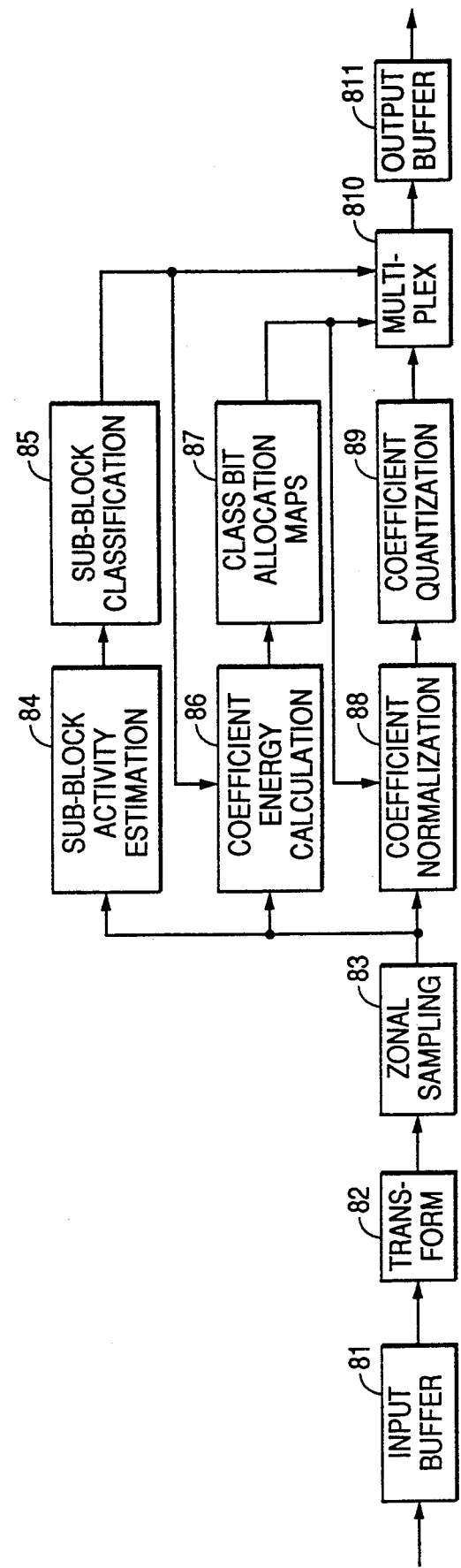
FIG. 8 is a block diagram of a prior art orthogonal transform coding apparatus.

FIG. 6 is a block diagram of a picture coding method showing a fourth embodiment of the present invention, in which is different from the first embodiment in that it does not output the transform coefficients to be omitted from coding to the transmission line, as compared to selection of the transform coefficients to be coded by zonal sampling.

As shown in FIG. 6, the detected motion vector is supplied to a scan control block 16 where the transform coefficients to be coded are selected in the same manner as that of the zonal sampling pattern selection block 13. The quantized transform coefficients from the quantization block 9 are indexed by a scan block 17 for delivery of the transform coefficients in such an order as described later. At the time, an index of the transform coefficients which are determined not to be coded by the scan control block 16 remains untransmitted. Accordingly, the transform coefficients to be omitted from coding are not transmitted to a coding device, ensuring the same effect as that of the first embodiment.

The operation of the scan control block 16 is implemented by the same arrangement as of the zonal sampling pattern selection block 13. While the zonal sampling pattern selection block 13 delivers a sampling pattern from its ROM, the scan control block 16 is arranged to deliver a signal of the transmission order.

The following is a description of the transmission of the transform coefficients to be coded. The index of the transform coefficients is output in a predetermined order from the scan block 17 to the transmission line. As the energy of transform coefficients is generally biased to the low sequence side in the transform space, a common 2-dimension orthogonal transform coding apparatus allows the transform coefficients having greater energy to be transmitted by priority and simultaneously, those having smaller energy to be omitted.

Figures 7A, 7B:
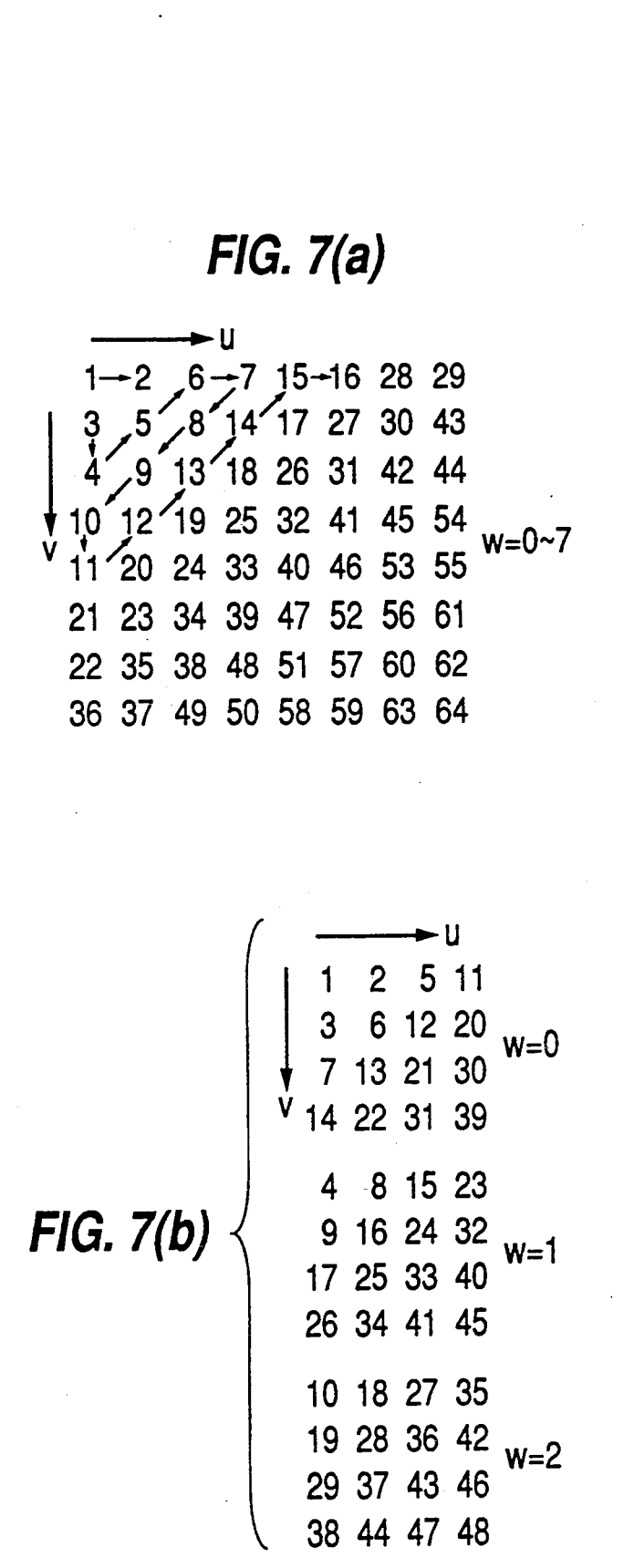

FIGS. 7(a) and 7(b) illustrate examples of the transmission of transform coefficients derived from the 3-dimensional blocks in the transform space according to the picture coding method of the present invention. As shown in FIG. 7(a), the transform coefficients of an 8×8×8 3-dimensional block are transmitted in a given order. The order is the same from w=0 to w=7 and the transmission starts with the smallest of w.

FIG. 7(b) shows the transmission starting with a transform coefficient F (u, v, w) of which coordinate sum (u+v+w) is smallest in the transform space and also, in which w is smallest. For simplicity, the 3-dimensional block is exhibited as a 3×3 unit. The order is however not limited to the example shown.

As described above, the transform coefficients having greater energy can initially be transmitted by the 3-dimension orthogonal transform coding apparatus.

Although the scan block 17 is provided after the quantization block 9 according to the embodiment, it may be disposed before it with equal success.

Although the 3-dimensional orthogonal transform process is explained throughout the embodiments, the present invention may be applied to a 2-dimension orthogonal transform process in which time-base sampling is omitted or the transform coefficients to be quantized are reduced in number.

It is understood that the different procedures of using a sampling pattern, controlling the step of quantization, and limiting the deliver to a transmission line are described in their respective embodiments and will also be employed in various combinations.

What is claimed is:

1. A picture coding method comprising the steps of:
receiving an uncompressed image signal;
translating a sample point in the uncompressed image signal from each of at least K-frames into a 3-dimensional block in the form of an $M \times N \times K$ sample point containing horizontal, vertical, and time-base components, in which the sample point which is a 3-dimensional block and represent by $$f(x, y, t) \ (x=0 \text{ to } M-1, y=0 \text{ to } N-1, t=0 \text{ to } K-1)$$

is orthogonally transformed to a transform coefficient of 3-dimension expressed as $$F(u, v, w) \ (u=0 \text{ to } M-1, v=0 \text{ to } N-1, w=0 \text{ to } K-1);$$

calculating the movement of the 2-dimensional block which is a part of the 3-dimensional block during a period of time between $t=0$ and $t=K-1$;
determining whether or not the transform coefficient is to be coded based on the calculated movement; and
outputting a compressed image signal in accordance with the coded transform coefficients, wherein spatial resolution is reduced and the time resolution is increased in regions where the calculated movement is high and wherein the spatial resolution is increased and the time resolution decreased in regions where the calculated movement is low.

2. A picture coding method according to claim 1, wherein the movement of the 2-dimensional block is determined as a combination of the horizontal movement mx and the vertical movement my, by means of block matching between $t=0$ and $t=k-1$, with reference to a 2-dimensional block, at $t=0$, of the 3-dimensional block $f(x, y, t)$.

3. A picture coding method according to claim 1, wherein assuming that the movement of a 2-dimensional block at $t=K-1$ is a combination of the horizontal movement mx and the vertical movement my, by means of block matching on the basis of a 2-dimensional block, at $t=0$, of the 3-dimensional block, the movement of the 2-dimensional block is determined as a combination of the horizontal movement $mx'=mx-(cx'-cx)$ and the vertical movement $my'=my-(cy'-cy)$ if the coordinate center of the 2-dimensional block is expressed at $t=0$ as (cx, cy) and at $t=K-1$ as (cx', cy').

4. A picture coding method comprising the steps of:
receiving an uncompressed image signal;
translating a sample point in the uncompressed image signal from each of at least K-frames into a 3-dimensional block in the form of an $M \times N \times K$ sample point containing horizontal, vertical, and time-base components, in which the sample point which is a 3-dimensional block and represented by $$f(x, y, t) \ (x=0 \text{ to } M-1, y=0 \text{ to } N-1, t=0 \text{ to } K-1)$$

is orthogonally transformed to a transform coefficient of 3-dimensions expressed as $$F(u, v, w) \ (u=0 \text{ to } M-1, v=0 \text{ to } N-1, w=0 \text{ to } K-1);$$

and
identifying the 3-dimensional block as a motion block if the energy ratio E0/E1 is smaller than a predetermined value or a still block if the energy ratio E0/E1 is greater than the predetermined value where E0 is the entire energy of the transform coefficient F (u, v, 0) which is present on a first plane extending across a point $w=0$ on the w-axis provided in the transform domain corresponding to the reverse axis of the time base t in a real space, expressed as $$E0 = \sum_{u=0}^{M-1} \sum_{v=0}^{N-1} [F(u,v,0) \times F(u,v,0)] - F(0,0,0)^2,$$

and E1 is the entire energy of the transform coefficient F (u, v, w) ($w \neq 0$) which is present on any plane after the first place associated with $w \neq 0$, expressed as $$E1 = \sum_{u=0}^{M-1} \sum_{v=0}^{N-1} \sum_{w=1}^{W-1} [F(u,v,w) \times F(u,v,w)];$$

determining whether or not the transform coefficient is to be coded based on whether or not the block is a motion block or a still block; and
outputting a compressed image signal in accordance with the coded transform coefficients, wherein spatial resolution is reduced and the time resolution is increased in motion block regions and wherein the spatial resolution is increased and the time resolution decreased in the still block regions.

5. A picture coding method according to claim 4, wherein the movement of the 3-dimensional block is determined as a combination of the horizontal movement $mx=Ec$ and the vertical movement $my=a \times Ec$, with reference to the energy ratio $Ec=E1/E0$ of the transform coefficient in the 3-dimensional block.

6. A picture coding method according to claims 2, 3, or 5 wherein the orthogonal transform coefficient F (u, v, w) satisfying $u<u1$, $v<v1$, or $w<w1$ is coded if $|mx|>mxh$, $|my|>myh$, or $|mz|<mzh$ respectively, where $|my|$ is the absolute horizontal movement, $|my|$ is the absolute vertical movement, mz is a square sum of the horizontal and vertical movements expressed as $mz=mx^2+my^2$, mxh, myh, and mzh are the thresholds of given movements, and u1, v1, and w1 are the thresholds of transform coefficients.

7. A picture coding method according to claims 2, 3, or 5, wherein assuming that the thresholds of transform coefficients up, vp, and wp are determined as up u1 if $|mx|>mxh$, up=u2 (where $u1<u2$) if $|mx| \leq mxh$, vp=v1 if $|my|>myh$, vp=v2 (where $v1<v2$) if $|my| \leq myh$, wp=w1 if $mz \leq mzh$, and wp=w2 (where $w1<w2$) if $mz>mzh$, where $|mx|$ is the absolute horizontal movement, $|my|$ is the absolute vertical movement, mz is a square sum of the horizontal and vertical movements expressed as $mz=mx^2+my^2$, mxh, myh, and mzh are the thresholds of given movements, and u1, v1, and w1 are the thresholds of transform coefficients, the orthogonal transform coefficient F (u, v, w) satisfying p (u, v, w) < c is coded where p (u, v, w) is the notation of a plane extending across the points (up, 0, 0), (0, vp, 0), and (0, 0, wp) in the 3-dimension orthogonal transform domain and c is a constant.

8. A picture coding method according to claims 2, 3, or 5, wherein assuming that the thresholds of transform coefficients up, vp, and wp are determined as up=u1 if $|mx|>mxh$, up=u2 (where u1<u2) if $|mx|\leq mxh$, vp=v1 if $|my|>myh$, vp=v2 (where v1 v2) if $|my|\leq$ myh, wp=w1 if mz<mzh, and wp w2 (where w1<w2) if $mz\leq mzh$, where $|mx|$ is the absolute horizontal movement, $|my|$ is the absolute vertical movement, mz is a square sum of the horizontal and vertical movements expressed as $mz=mx^2+my^2$, mxh, myh, and mzh are the thresholds of given movements, and u1, v1, and w1 are the thresholds of transform coefficients, the orthogonal transform coefficient F (u, v, w) satisfying g (u, v, w) < c is coded where g (u, v, w) is the notation of a curved plane extending across the points (up, 0, 0), (0, vp, 0), and (0, 0, wp) in the 3-dimension orthogonal transform domain and c is a constant.

9. A picture coding method comprising the steps of:
receiving an uncompressed image signal;
translating a sample point in the uncompressed image signal at the time t into a 2-dimensional block in the form of an M×N sample point containing horizontal, vertical, and time-base components, in which the sample point which is a 2-dimensional block and represented by $$f(x, y) (x=0 \text{ to } M-1, y=0 \text{ to } N-1)$$

is orthogonally transformed to a transform coefficient of 2-dimension expressed as $$F(u, v) (u=0 \text{ to } M-1, v=0 \text{ to } N-1);$$

calculating the horizontal movement mx and the vertical movement my of the 2-dimensional block at the time t+1 by means of block matching;
determining whether or not the transform coefficient is to be coded based on the calculated movement; and
outputting a compressed image signal in accordance with the coded transform coefficients, whether spatial resolution is reduced in motion block regions and is increased in still block regions.

10. A picture coding method according to claim 9, wherein the orthogonal transform coefficient F (u, v) satisfying u<u1 or v<v1 is coded if $|mx|>mxh$ or $|my|<myh$ respectively, where $|mx|$ is the absolute horizontal movement, $|my|$ is the absolute vertical movement, mxh and myh are the thresholds of given movements, and u1 and v1 are the thresholds of transform coefficients.

11. A picture coding method according to claim 9, wherein assuming that the thresholds of transform coefficients up and vp are determined as up=u1 if $|mx|>mxh$, up=u2 (where u1<u2) if $|mx|<mxh$, vp=v1 if $|my|>myh$, and vp=v2 (where v1<v2) if $|my|\leq myh$, where $|mx|$ is the absolute horizontal movement, $|my|$ is the absolute vertical movement, mxh and myh are the thresholds of given movements, and u1 and v1 are the thresholds of transform coefficients, the orthogonal transform coefficient F (u, v) satisfying p (u, v) < c is coded where p (u, v) is the notation of a line extending across the points (up, 0) and (0, vp) in the 2-dimension orthogonal transform domain and c is constant.

12. A picture coding method according to claim 9, wherein assuming that the thresholds of transform coefficients up and vp are determined as up=u1 if $|mx|>mxh$, up=u2 (where u1<u2) if $|mx|\leq mxh$, vp=v1 if $|my|>myh$, and vp=v2 (where v1<v2) if $|my|\leq myh$, where $|mx|$ is the absolute horizontal movement, $|my|$ is the absolute vertical movement, mxh and myh are the thresholds of given movements, and u1 and v1 are the thresholds of transform coefficients, the orthogonal transform coefficient F (u, v) satisfying g (u, v) < c is coded where g (u, v) is the notation of a curved line extending across the points (up, 0) and (0, vp) in the 2-dimension orthogonal transform domain and c is a constant.

13. A picture coding method according to any of claims 1 to 3, 5, 9–12, wherein the transform coefficient to be omitted from coding in the transform domain is designated as 0.

14. A picture coding method according to any of claims 1 to 3, 5, 9–12, wherein the transform coefficients to be omitted from coding are quantified at greater steps than those to be coded.

15. A picture coding method according to any of claims 1 to 3, 5, 9–12, wherein the transform coefficients to be omitted from coding in the transform domain are not output to the transmission line.

16. A picture coding method comprising the steps of:
receiving an uncompressed image signal;
translating a sample point in the uncompressed image signal from each of at least K-frames into a 3-dimensional block in the form of an M×N×K sample point containing horizontal, vertical, and time-base components, in which the sample point which is a 3-dimensional block and represented by $$f(x, y, t) (x=0 \text{ to } M-1, y=0 \text{ to } N-1 \ t=0 \text{ to } K-1)$$

is orthogonally transformed to a transform coefficient of 3-dimension expressed as $$F(u, v, w) (u=0 \text{ to } M-1, v=0 \text{ to } N-1, w=0 \text{ to } K-1);$$

separating a group of the F (u, v, w) coefficients into motion blocks and still blocks according to results of a motion detection; and
after separation into the motion and still blocks, dividing the group of the F(u, v, w) coefficients into k1 and k2 classes by the amount of energy of each 3-dimensional block expresses as $$E = \sum_{u=0}^{M-1} \sum_{v=0}^{N-1} \sum_{w=0}^{W-1} [F(u,v,w) \times F(u,v,w)] - F(0,0,0)^2$$

and determining the allocation of bits in each class in proportion to the variance of transform coefficient of the 3-dimensional block in the class, the variance being represented by $$\sigma^2(u,v,w);$$
$$k$$

determining whether or not the transform coefficient is to be coded based on whether or not the block is a motion block or a still block; and outputting a compressed image signal in accordance with the coded transform coefficients, wherein spatial resolution is reduced and the time resolution is increased in motion block regions and wherein the spatial resolution is increased and the time resolution decreased in the still block regions.

17. A picture coding method according to claim 16, wherein the movement of a 2-dimensional block of the 3-dimensional block f (x, y, z) is determined as a combination of the horizontal movement mx and the vertical movement my, by means of block matching between t=0 and t=K−1, with reference to a 2-dimensional block at t=0.

18. A picture coding method according to claim 16, wherein assuming that the movement of a 2-dimensional block at t=K−1 is a combination of the horizontal movement mx and the vertical movement my, by means of block matching on the basis of a 2-dimensional block, at t=0, of the 3-dimensional block, the movement of the 2-dimensional block is determined as a cobination of the horizontal movement mx'=mx−(cx'−cx) and the vertical movement my'=my−(cy'−cy) if the coordinate center of the 2-dimensional block is expressed at t=0 as (cx, cy) and at t=K−1 as (cx', cy').

19. A picture coding method comprising the steps of:
receiving an uncompressed image signal;
translating a sample point in the uncompressed image signal at the time t into a 2-dimensional block in the form of an M×N sample point containing horizontal, vertical, and time-base components, in which the sample point which is a 2-dimensional block and represented by $f(x, y) \; x=0 \text{ to } M-1, y=0 \text{ to } N-1)$ is orthogonally transformed to a transform coefficient of 2-dimension expressed as $F(u, v) \; (u=0 \text{ to } M-1, v=0 \text{ to } N-1);$ calculating the horizontal movement mx and the vertical movement my of the 2-dimensional block at t=1 by means of block matching;
separating a group of the F (u, v) coefficients into motion blocks and still blocks according to results of a motion detection; and
after separation into the motion and still blocks, dividing the group of the F (u, v) coefficients into k1 and k2 classes by the amount of energy of each 2-dimensional block expressed as $$E = \sum_{u=0}^{M-1} \sum_{v=0}^{N-1} [F(u,v) \times F(u,v)] - F(0,0)^2$$

and determining the allocation of bits in each class in proportion to the variance of a transform coefficient of the 2-dimensional block in the class, the variance being represented by $\sigma^2(u,v,w);$
$k$ determining whether or not the transform coefficient is to be coded based on whether or not the block is a motion block or a still block; and
outputting a compressed image signal in accordance with the coded transform coefficients, wherein spatial resolution is reduced in motion block regions and is increased in still block regions.

20. A picture coding method comprising the steps of:
receiving an uncompressed image signal
translating a sample point in the uncompressed image signal from each of at least K-frames into a 3-dimensional block in the form of an M×N×K sample point containing horizontal, vertical, and time-base components, in which the sample point which is a 3-dimensional block and represented by $f(x, y, t) \; (x=0 \text{ to } M-1, y=0 \text{ to } N-1, t=0 \text{ to } K-1)$ is orthogonally transformed to a transform coefficient of 3-dimension expressed as $F(u, v, w) \; (u=0 \text{ to } M-1, v=0 \text{ to } N-1, w=0 \text{ to } K-1);$ coding the transform coefficients in a sequence from a first plane extending across a point w=0 on the w-axis provided in the transform domain corresponding to the reverse axis of the time base in a real domain, a second plane extending across a point w=1 on the w-axis, a third plan, . . . to a (K−1)th plane; and
outputting a compressed image signal in accordance with the coded transform coefficients.

21. A picture coding method comprising the steps of:
receiving an uncompressed image;
translating a sample point in the uncompressed image signal from each of at least K-frames into a 3-dimensional block in the form of an M×N×K sample point containing horizontal, vertical, and time-base components, in which the sample point which is a 3-dimensional block and represented by $f(x, y, t) \; x=0 \text{ to } M-1, y=0 \text{ to } N-1, t=0 \text{ to } K-1)$ is orthogonally transformed to a transform coefficient of 3-dimension expressed as $F(u, v, w) \; (u=0 \text{ to } M-1, v=0 \text{ to } N-1, w=0 \text{ to } K-1);$ transmitting the F (u, v, w) transform coefficients in a sequence from the smallest thereof in the sum of u, v, and w are also, in which w is smaller for coding the F (u, v, w) transform coefficients in an order from the lowest sequency transform coefficient; and
outputting a compressed image signal in accordance with the coded transform coefficients.

22. An image processing method for detecting motion in picture formed by the image signal comprising the steps of:
receiving an image signal;
sampling the image signal and translating a sample point in the image signal from each of at least K-frames into a 3-dimensional block in the form of an M×N×K sample point containing horizontal, vertical, and time-base components, in which the sample point which is a 3-dimensional block and represented by $f(x, y, t)$ $(x=0$ to $M-1, y=0$ to $N-1, t=0$ to $K-1)$ is orthogonally transformed to a transform coefficient of 3-dimensions expressed as $F(u, v, w)$ $u=0$ to $M-1, v=0$ to $N=1, w=0$ to $K-1$);

identifying the 3-dimensional block as a motion block if the energy ratio E0/E1 is smaller than a predetermined value or a still block if the energy ratio E0/E1 is greater than the predetermined value where E0 is the entire energy of the transform coefficient F (u, v, o) which is present on a first plane extending across a point w=0 on the w-axis provided in the transform domain corresponding to the reverse axis of the time base t in a real space, expressed as $$E0 = \sum_{u=0}^{M-1} \sum_{v=0}^{N-1} [F(u,v,0) \times F(u,v,0)] - F(0,0,0)^2,$$

is E1 and the entire energy of the transform coefficient F and E1 is the entire energy of the transform coefficient $F(u, v, w)$ $(w \neq 0)$ which is present on any plane after the first place associated with $w \neq 0$, expressed as $$E1 = \sum_{u=0}^{M-1} \sum_{v=0}^{N-1} \sum_{w=1}^{W-1} [F(u,v,w) \times F(u,v,w)]$$

outputting results of the identification of the 3-dimensional block as a motion block or as a still block.

* * * * *